No. 847,759. PATENTED MAR. 19, 1907.
A. I. GANCHER & A. T. ZABRISKIE.
ADDING MACHINE.
APPLICATION FILED JULY 28, 1906.

3 SHEETS—SHEET 1.

WITNESSES
Edward Thorpe

INVENTORS
Abraham I. Gancher
Albert T. Zabriskie
BY
ATTORNEYS

No. 847,759. PATENTED MAR. 19, 1907.
A. I. GANCHER & A. T. ZABRISKIE.
ADDING MACHINE.
APPLICATION FILED JULY 28, 1906.

3 SHEETS—SHEET 2.

WITNESSES
Edward Thorpe,

INVENTORS
Abraham I. Gancher
Albert T. Zabriskie
BY Munn & Co
ATTORNEYS

No. 847,759.   
PATENTED MAR. 19, 1907.
A. I. GANCHER & A. T. ZABRISKIE.
ADDING MACHINE.
APPLICATION FILED JULY 28, 1906.
3 SHEETS—SHEET 3.
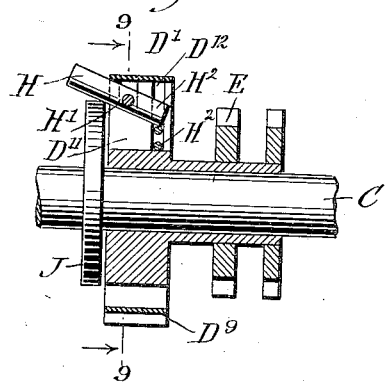
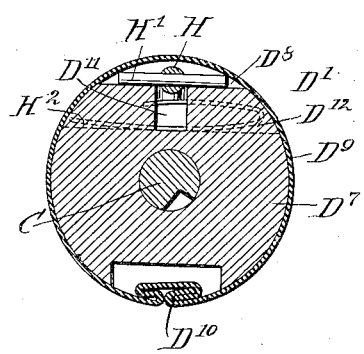
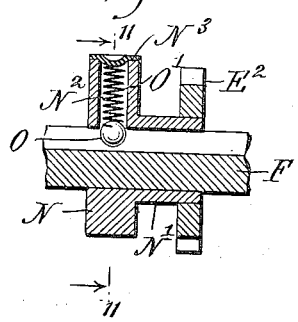
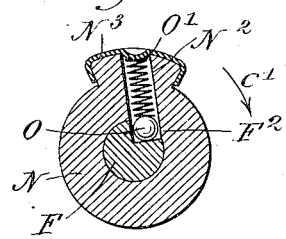
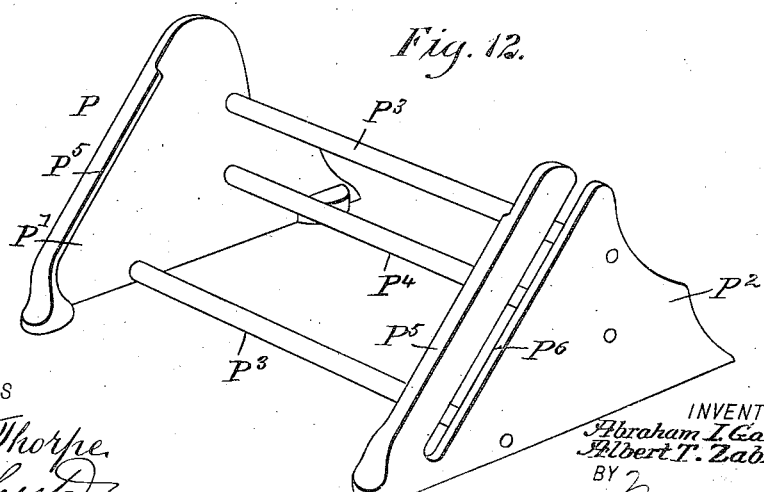
WITNESSES
Edward Thorpe.
Rev. G. Hooster
INVENTORS
Abraham I. Gancher
Albert T. Zabriskie
BY Munn & Co
ATTORNEYS

UNITED STATES PATENT OFFICE.

ABRAHAM I. GANCHER, OF NEW YORK, N. Y., AND ALBERT T. ZABRISKIE, OF PASSAIC, NEW JERSEY, ASSIGNORS TO AUTOMATIC ADDING MACHINE COMPANY, OF NEW YORK, N. Y.

ADDING-MACHINE.

No. 847,759. Specification of Letters Patent. Patented March 19, 1907.

Application filed July 28, 1906. Serial No. 328,277.

*To all whom it may concern:*

Be it known that we, ABRAHAM I. GANCHER, a citizen of the United States, and a resident of the city of New York, borough of Manhattan, in the county and State of New York, and ALBERT T. ZABRISKIE, a citizen of the United States, and a resident of Passaic, in the county of Passaic and State of New Jersey, have invented a new and Improved Adding-Machine, of which the following is a full, clear, and exact description.

The invention relates to adding-machines, such as shown and described in the Letters Patent of the United States No. 816,342, granted to Nobyoshi H. Kodama and Abraham I. Gancher on March 27, 1906.

The object of the present invention is to provide a new and improved adding-machine arranged to render the action of the number-wheels positive and without danger of the parts easily getting out of order and to allow convenient and quick resetting of the machine to zero whenever it is desired to do so.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1:
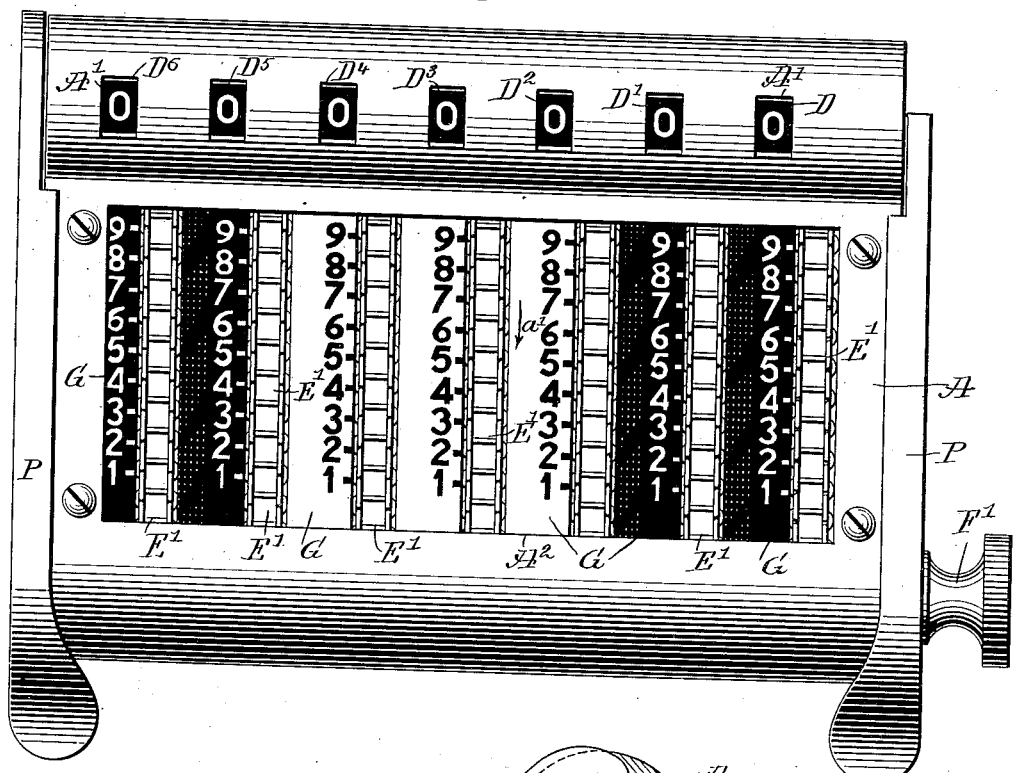
Figure 2:
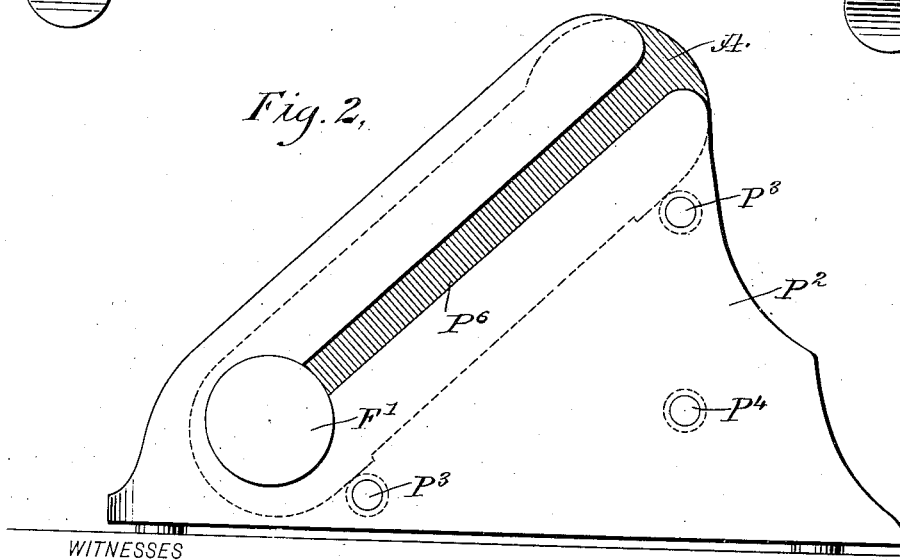
Figure 3:
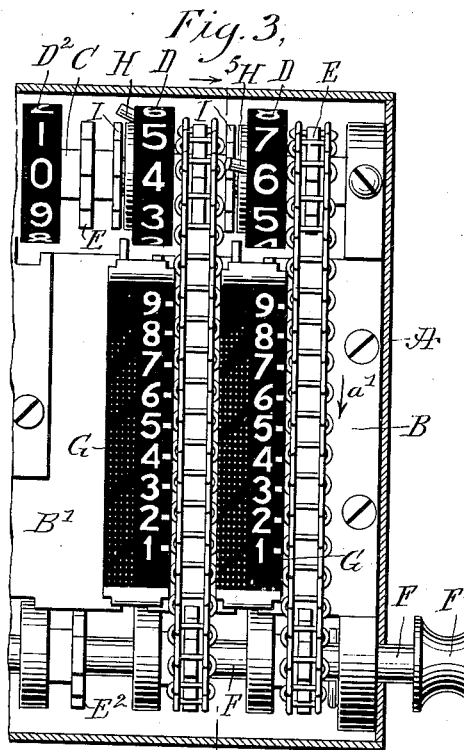
Figure 4:
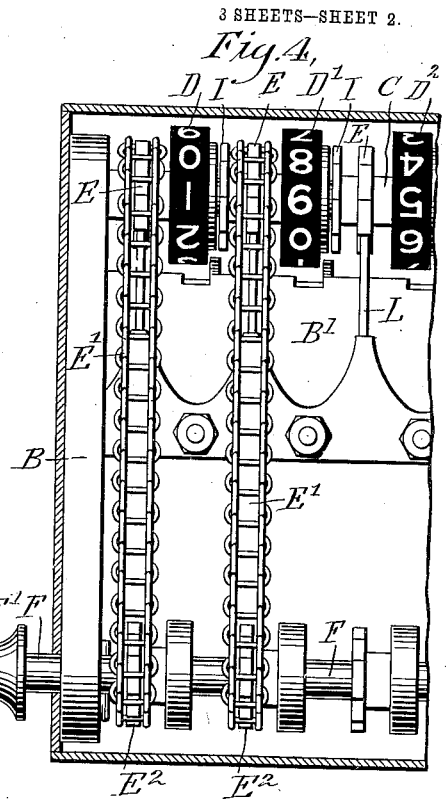
Figure 5:
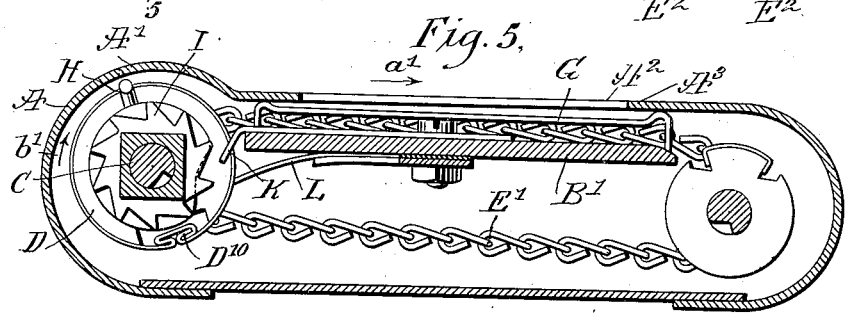
Figure 6:
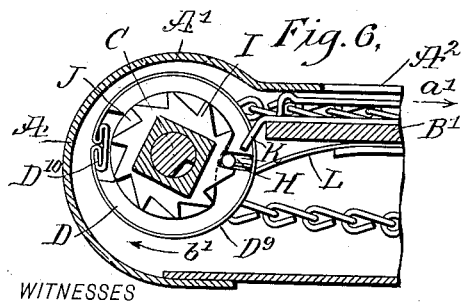
Figure 7:
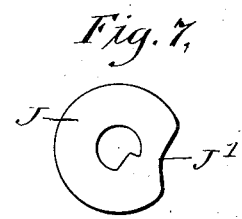

Figure 1 is a face view of the improvement. Fig. 2 is a side elevation of the same. Fig. 3 is a face view of one end of the improvement, the casing being shown in section. Fig. 4 is a rear face view of the same, the casing being shown in section. Fig. 5 is a cross-section of the improvement on the line 5 5 of Fig. 3. Fig. 6 is a similar view of the same, parts being in different position. Fig. 7 is a face view of one of the disk cams. Fig. 8 is an enlarged sectional plan view of one of the number-wheels and adjacent parts. Fig. 9 is a transverse section of the same on the line 9 9 of Fig. 8. Fig. 10 is an enlarged sectional plan view of part of the zero or resetting device. Fig. 11 is a cross-section of the same on the line 11 11 of Fig. 10, and Fig. 12 is a perspective view of the stand for supporting the adding-machine.

The casing A of the adding-machine contains a frame B, in the upper end of which is secured a shaft C, on which are mounted to turn loosely number-wheels D, D', $D^2$, $D^3$, $D^4$, $D^5$, and $D^6$, each having on its peripheral face the numerals from "0" to "9," the number-wheel D representing unit cents, the number-wheel D' tens of cents, and the number-wheels $D^2$, $D^3$, $D^4$, $D^5$, and $D^6$ representing unit dollars, tens of dollars, hundreds of dollars, and thousands and tens of thousands of dollars. It is, however, expressly understood that the number-wheels may represent other denominations of money besides dollars and cents mentioned.

The numeral which is on the top of a number-wheel at the time is visible at a corresponding aperture A' in the casing A to allow the operator to read the aggregate amount of the sums added, as hereinafter more fully described.

In order to turn each number-wheel manually and independently of the others, the following device is provided: On the hub of each number-wheel D, D', $D^2$, $D^3$, $D^4$, $D^5$, and $D^6$ is secured a sprocket-wheel E, over which passes a sprocket-chain E', also passing over a sprocket-wheel $E^2$, mounted to turn loosely in one direction on a resetting-spindle F, journaled in the frame B and extending with one end through one side of the casing A, the outer end of the resetting-spindle F carrying a knob F' to permit the operator of turning the spindle with a view to reset the number-wheels D, D', $D^2$, $D^3$, $D^4$, $D^5$, and $D^6$ to zero, as hereinafter more fully described.

The top run of each sprocket-chain E' travels over a table B', forming part of the frame B, and the upper run of each chain extends in a guideway formed by numeral-plates G, secured or forming part of the table B' or its supporting-frame B. The upper surfaces of the numeral-plates G are provided with the numerals "0" to "9" in transverse alinement with a corresponding aperture A', the distance between the adjacent numerals corresponding to the length of a link of the chain E'. The numeral-plates G and portions of the upper runs of the chain E' appear through an opening $E^2$ in the top of the casing A to allow the operator to see the numerals on the face and to engage the link of the chain E' by the use of a suitable tool in the hand of the operator to pull the chain along in the direction of the arrow $a'$ until the tool abuts against the lower edge $A^3$ of the aperture $A^2$, the said lower edge $A^3$ thus forming a stop for the tool. Thus when the chain is pulled by the use of the tool the corresponding number-wheel is turned a distance corresponding to the travel of the chain. Now if, for instance, it is desired to add "4" at any one of the devices it is only necessary for the operator to engage the tool with the corresponding chain at the link in register with the numeral "4" of the adjacent numeral-plate G and to then pull on the chain in the direction of the arrow $a'$ until the tool abuts against the lower edge $A^3$ of the aperture $A^2$, the tool then being disengaged from the chain-link. If it is desired to add "9" at any one of the devices, the tool is engaged with the corresponding chain at the link registering with the numeral "9" of the numeral-plate G and then the chain is pulled downward until the tool abuts against the lower edge $A^3$ of the aperture $A^2$. The number-wheels turn in the direction of the arrow $b'$. (See Figs. 5 and 6.)

The numeral-plates G for the units and tens of cents are preferably in contrast to the adjacent numeral-plates G for the units, tens, and hundreds of dollars, and the thousands and tens of thousands numeral-plates G are likewise in contrast to the said units, tens, and hundreds of dollars numeral-plates to enable the operator to readily distinguish the several numeral-plates with a view to facilitating the use of the machine.

In order to turn a number-wheel from a preceding one whenever the latter moves from "9" to "0," the following device is provided: In each number-wheel D, D', $D^2$, $D^3$, $D^4$, and $D^5$ is fulcrumed a sidewise-extending pawl H, adapted to engage a ratchet-wheel I, secured on the hub of the next following number-wheel, and the said pawl H rides on the peripheral face of a disk cam J, secured to the fixed shaft C. Each disk cam J is arranged to normally hold the corresponding pawl H out of engagement with the next following ratchet-wheel I, and each disk cam J is provided with a cut-out portion J' (see Figs. 5, 6, and 7) to allow the pawl H to move into engagement with a tooth of the ratchet-wheel I with a view to turn the latter to rotate the following number-wheel a sufficient distance to bring the next following numeral into view at the aperture A'. In order to cause the pawl H to follow the peripheral face of the disk cam J, the pawl is spring-pressed, and for this purpose the following arrangement is made, special reference being had to Figs. 8 and 9: The pawl H is provided with a transversely-extending pivot-pin H' and an extension $H^2$, as plainly indicated in Fig. 8, and the said pivot-pin H' extends into a transverse slot $D^8$, formed in the body $D^7$ of the corresponding number-wheels D, D', $D^2$, $D^3$, $D^4$, and $D^5$, and the said slot $D^8$ is covered by a rim $D^9$, fitted on the body $D^7$ and preferably made of sheet metal, having its ends interlocked, as indicated at $D^{10}$ in Fig. 9. The rim $D^9$ carries at its peripheral surface the numerals "0" to "9," as previously mentioned. The pawl H and its extension $H^2$ are free to swing in a longitudinal slot $D^{11}$, formed in the body $D^7$, and the extension $H^2$ of the pawl H is pressed on at the under side by the free end of a spring $H^3$, held in a transverse slot $D^{12}$, formed in the body $D^7$ of the corresponding number-wheel. Now by reference to Figs. 8 and 9 it will be seen that the ends of the slot $D^{12}$ are closed by the rim $D^9$, and consequently the spring $H^3$ is securely confined within its slot $D^{12}$ by the rim $D^9$, and the latter also serves to hold the pivot-pin H' against lateral movement in its slot $D^8$. By the arrangement described the number-wheel and the pawl H, carried thereby, can be very cheaply constructed, and at the same time the spring $H^3$ holds the pawl H in firm peripheral contact with the cam-disk J to cause the cam to follow the peripheral face and the cut-out portion J' when the number-wheel is rotated.

In order to aid the pawl H to travel inwardly on the cut-out portion J', a cam-arm K is provided (see Figs. 5 and 6) registering with the cut-out portion J', and consequently causing the pawl H to follow the cut-out portion J', and thereby engage a tooth of the ratchet-wheel I with a view to turn the same and its number-wheel, it being understood that the corresponding sprocket-wheel E and the chain E' move with the number-wheel. When the number-wheel D, for instance, turns from "9" to "0," then the pawl H of this number-wheel D engages the ratchet-wheel I, secured on the hub of the number-wheel D', and thus turns the number-wheel D' the distance between two successive numerals to bring the next following numeral in view at the aperture A'. In other words, when the number-wheel D has completed a revolution and registered "9" cents it turns the next number-wheel D' to the following numeral to indicate a corresponding "10." In a like manner the number-wheel D' turns the number-wheel $D^2$ and the latter the number-wheel $D^3$, and so on throughout the series, whenever a number-wheel moves from "9" to "0" position.

In order to prevent the number-wheels and the parts attached thereto from turning in a reverse direction or accidentally beyond the distance they should travel spring-dogs L are provided engaging at the time a tooth of the corresponding sprocket-wheel A, as indicated in Fig. 4.

In order to permit of conveniently resetting the several number-wheels D, D', $D^2$, $D^3$, $D^4$, and $D^5$ to "0" before starting on the operation, the following device is provided:

Each sprocket-wheel $E^2$ is secured on the polygonal hub $N'$ of a wheel $N$, mounted loosely on the spindle $F$ and provided with a radially-disposed recess $N^2$, in the bottom of which is a ball $O$, adapted to engage a V-shaped longitudinally-extending recess $F^2$, formed in the spindle $F$, as plainly indicated in Figs. 10 and 11. The ball $O$ is pressed on by a spring $O'$, held in the recess $N^2$, and the outer end of the spring $O'$ abuts against the under side of a cap $N^3$, attached to the wheel $N$. Now by the arrangement described the wheel $N$ is free to rotate on the spindle $F$ in the direction of the arrow $c'$ when the machine is used as above described, it being understood that the ball $O$ freely travels out of the groove $F^2$ and on the peripheral surface of the spindle $F$ as long as the wheel $N$ is turned in the direction of the arrow $c'$ by the rotating wheel $E^2$ traveling in the same direction. When it is desired to reset the adding-machine to zero position, then the operator takes hold of the knob $F'$ and turns the same in the direction of the arrow $c'$, so that the ball $O$ when dropping into the recess $N^2$ is carried along by the back wall thereof, whereby the wheel $N$ is rotated, and with it the ratchet-wheel $E^2$. When this takes place, the ratchet-wheel $E^2$ causes a traveling of the sprocket-chain $E'$ and a rotation of the sprocket-wheel $E$ in the same direction, as above described—that is, in the direction of the arrows $c'$ $d'$—and consequently the corresponding number-wheel is rotated in the direction of the arrow $d'$. Now as all the wheels $N$ on the spindle $F$ are ultimately carried along on turning the knob $F'$ it is evident that the several number-wheels $D$, $D'$, $D^2$, $D^3$, $D^4$, and $D^5$ finally reach a zero position—that is, the numerals "0" of the several number-wheels will all appear in the corresponding apertures $A'$.

The operation is as follows: Presuming that the aggregate amount of several sums already added by the use of the machine is three hundred dollars and thirty-two cents and the next sum to be added is five thousand two hundred dollars, then the operator by the use of a pointed tool engages the chain $E'$ for the number-wheel $D^4$ (hundreds of dollars) opposite the number "2" on the wheel-plate $G$ and then pulls this chain downward until the tool abuts against the edge $A^3$ of the opening $A^2$. The tool is then disengaged from the chain. The travel of the chain causes the rotation of the number-wheel $G^4$ to the extent of two numbers, so that the numeral "5" of this number-wheel now appears in the aperture $A'$. The operator now engages the tool with the chain $E'$ for the number-wheel $D^5$ opposite the numeral "5," as the sum to be added calls for five thousands of dollars, and then the operator pulls this chain downward until the tool abuts against the edge $A^3$, and this movement of the chain causes the wheel $D^5$ to turn from zero position until the numeral "5" appears in the corresponding aperture $A'$. The total amount now indicated at the openings $A'$ appears as "$5,500.32"—that is, the aggregate amount of the original sum of three hundred dollars and thirty-two cents and that of the amount added, five thousand two hundred dollars. If the next following check is for, say, eighty-four cents, the operator engages the tool with the chain $E'$ for the number-wheel $D$ opposite the numeral "4" of the corresponding numeral-plate $G$ and then pulls the chain downward, as previously described, so that the wheel $D$ is turned until the numeral "6" appears in the aperture $A'$. The operator now engages the tool with the chain for the number-wheel $D'$ opposite the numeral "8" of the corresponding numeral-plate and then pulls the chain downward. The number-wheel $D'$ is turned a distance of eight numbers, and in doing so the wheel stops with the numeral "1" displayed in the opening $A'$, and as the wheel was turned from "9" to "0" it is evident that its pawl $H$ engaged the ratchet-wheel of the next following number-wheel $D^2$, so that the latter was turned to the following number—that is, to the number "1"—which now appears in the opening $A'$, and the total amount now registered is "$5,501.16." When it is desired to reset the machine so that "0" of the several wheels $D$, $D'$, $D^2$, $D^3$, $D^4$, and $D^5$ appears in the openings $A'$, it is only necessary for the operator to turn the knob $F'$ in the direction of the arrow $c'$, so that the spindle $F$ is turned, and with it the several wheels $N$ and ratchet-wheels $E^2$, as previously explained, to cause the chain $E'$ to rotate the ratchet-wheels $E$ and the number-wheels $D$, $D'$, $D^2$, $D^3$, $D^4$, and $D^5$ until "0" of the several wheels appears in the openings $A'$. The machine is now again ready for adding other sums.

Instead of working the machine from the right to the left, as described—that is, starting with the unit cents—it may be actuated from the left to the right, the final total appearing through the openings $A'$ in either case.

In practice it is desirable to place the casing $A$ into a stand $P$, (illustrated in Figs. 1, 2, and 12,) and this stand $P$ is provided with two sideplates $P'$ $P^2$, connected with each other by cross-bars $P^3$ $P^4$, of which the cross-bars $P^3$ are adapted to support the back of the casing $A$, while the front thereof rests against flanges $P^5$, formed on the sides $P'$ and $P^2$ at the front edges thereof, the said flanges $P^5$ being curved downwardly and inwardly at the bottom to form a seat for the bottom of the casing $A$. The side $P^2$ is provided with an elongated slot $P^6$ for the passage of the outer end of the spindle $F$, so that the knob $F'$ projects from the outer face of the side $P^2$ to be within convenient reach of the operator whenever it is desired to reset the machine, as above described.

The adding-machine may be held in the hand and worked instead of placed on the stand, and as the machine is very compact it does not take up much space, can be conveniently carried in the pocket, and used at any time. By having the resetting device constructed in the manner described it takes the operator but a few moments to set the number-wheels to "0" to permit the almost instant use of the machine for adding up any column of figures. As the machine is simple in construction and its working parts comparatively few and not liable to easily get out of order, the long life of the machine is insured.

Having thus described our invention, we claim as new and desire to secure by Letters Patent—

1. An adding-machine, comprising a series of number-wheels, each having a body provided with transverse and longitudinal recesses, and a removable rim comprising a strip having interlocking ends, manually-controlled means for turning the said number-wheels independently one of the other, a ratchet-wheel for each number-wheel, a pawl projecting sidewise from each number-wheel in the longitudinal slot therein, the pawl being fulcrumed in the longitudinal recesses of the number-wheel body, a spring held in the transverse recesses of the number-wheel body, and pressing the extension of the pawl, the latter being adapted to engage the ratchet-wheel of the next following number-wheel in the series, and fixed disk cams one for each pawl, concentric with the number-wheels, each disk cam normally holding corresponding pawls out of engagement with the ratchet-wheel of the next following number-wheel, the disk cam having a cut-out portion for allowing the pawl to move into engagement with the ratchet-wheel when the number-wheel carrying the pawl completes a turn.

2. The combination with a stand having an inclined seat and a slot in one side, of an adding-machine having a casing shaped to correspond to the said seat, the adding-machine having a spindle extending through the said slot.

3. An adding-machine provided with a number-wheel having a body formed with intersecting slots, and a rim removably fitting the body and extending over the peripheral ends of the slots.

4. An adding-machine provided with a number-wheel having a body formed with intersecting slots, a rim removably fitting the body and extending over the peripheral ends of the slots, a pawl movable in one slot and having its fulcrum-pin fitting another slot, the said rim holding the fulcrum-pin in position, and a spring held in another of the slots and pressing the said pawl.

5. The combination with a stand having an inclined seat and a slot on one side, of an adding-machine having a casing shaped to correspond to the said seat, the adding-machine having a spindle extending through the said slot, and the stand having flanges overlapping the adding-machine on the front thereof, whereby to retain it in position.

In testimony whereof we have signed our names to this specification in the presence of two subscribing witnesses.

ABRAHAM I. GANTHER.
ALBERT T. ZABRISKIE.

Witnesses:
  THEO. G. HOSTER,
  E. C. NIELSON.